US012743360B1

(12) United States Patent
Seymour et al.

(10) Patent No.: US 12,743,360 B1
(45) **Date of Patent: *Sep. 22, 2026**

(54) SYSTEMS AND METHODS FOR CONTAINERIZED INFORMATION TECHNOLOGY RESOURCE MANAGEMENT BASED ON CUSTOMIZATION OF KUBERNETES PODS

(71) Applicant: EDJX, INC., Raleigh, NC (US)

(72) Inventors: Delano Seymour, St George's (BM); Douglas Steele, Grand Cayman (KY); John Cowan, Raleigh, NC (US)

(73) Assignee: EDJX, INC., Raleigh, NC (US)

( * ) Notice: Subject to any disclaimer, the term of this patent is extended or adjusted under 35 U.S.C. 154(b) by 582 days.

This patent is subject to a terminal disclaimer.

(21) Appl. No.: 17/477,105

(22) Filed: Sep. 16, 2021

Related U.S. Application Data

(63) Continuation of application No. 16/418,480, filed on May 21, 2019, now Pat. No. 11,126,530, which is a continuation of application No. 16/038,936, filed on Jul. 18, 2018, now Pat. No. 10,303,576.

(60) Provisional application No. 62/666,910, filed on May 4, 2018.

(51) Int. Cl.

| | |
|---|---|
| ***G06F 11/34*** | (2006.01) |
| ***G06F 9/455*** | (2018.01) |
| ***G06F 11/30*** | (2006.01) |
| ***G06F 16/25*** | (2019.01) |
| ***G06Q 40/06*** | (2012.01) |
| ***H04L 41/50*** | (2022.01) |

(52) U.S. Cl.
CPC ...... *G06F 11/3442* (2013.01); *G06F 9/45558* (2013.01); *G06F 11/3051* (2013.01); *G06F 11/3082* (2013.01); *G06F 11/3433* (2013.01); *G06F 16/254* (2019.01); *G06Q 40/06* (2013.01); *H04L 41/5029* (2013.01); *G06F 2009/45587* (2013.01); *G06F 2009/45591* (2013.01); *G06F 2009/45595* (2013.01); *G06F 2201/815* (2013.01)

(58) Field of Classification Search
CPC ............. G06F 11/3442; G06F 11/3051; G06F 11/3082; G06F 11/3433; G06F 16/25; G06F 9/45558; G06F 2009/45591; G06F 2201/815; G06Q 40/06; H04L 41/5029
USPC .............................................................. 718/1
See application file for complete search history.

(56) References Cited

U.S. PATENT DOCUMENTS

| | | | |
|---|---|---|---|
| 7,499,968 B1 | 3/2009 | Alexander et al. | |
| 7,672,882 B2 | 3/2010 | Agarwal et al. | |
| 7,756,989 B2 | 7/2010 | Goldszmidt et al. | |
| 8,046,763 B1 | 10/2011 | Czajkowski et al. | |
| 8,145,455 B2 | 3/2012 | Cherkasova et al. | |
| 8,260,603 B2 | 9/2012 | Cherkasova et al. | |
| 8,756,302 B2 | 6/2014 | Cowan et al. | |
| 9,900,444 B1 * | 2/2018 | Seetharaman .... | H04M 15/8044 |
| 9,985,827 B2 | 5/2018 | Li et al. | |

(Continued)

*Primary Examiner* — Zujia Xu
(74) *Attorney, Agent, or Firm* — Neo IP

(57) ABSTRACT

Systems and methods for containerized IT intelligence and management. In one embodiment, a system for containerized IT financial management comprises at least one collector, at least one meter, at least one connector, and a reporting dashboard. The at least one collector is customized and connected to at least one container platform. The at least one collector sends capacity and consumption metrics to the at least one meter for processing and aggregation.

14 Claims, 6 Drawing Sheets

(56) References Cited

U.S. PATENT DOCUMENTS

| | | | | |
|---|---|---|---|---|
| 10,303,576 | B1 * | 5/2019 | Seymour | G06F 11/301 |
| 11,126,530 | B1 * | 9/2021 | Seymour | H04L 41/5029 |
| 2006/0225079 | A1 | 10/2006 | Nayak et al. | |
| 2008/0097801 | A1 | 4/2008 | MacLellan et al. | |
| 2008/0178190 | A1 | 7/2008 | Anstey et al. | |
| 2009/0235267 | A1 | 9/2009 | Mckinney et al. | |
| 2009/0328050 | A1 | 12/2009 | Liu et al. | |
| 2011/0219118 | A1 * | 9/2011 | Cowan | H04L 43/022 709/224 |
| 2013/0339498 | A1 * | 12/2013 | Johnson | H04L 67/104 709/221 |
| 2016/0275469 | A1 | 9/2016 | Gendler | |
| 2017/0006135 | A1 * | 1/2017 | Siebel | G06Q 10/06 |
| 2017/0111241 | A1 * | 4/2017 | Degioanni | H04L 43/045 |
| 2017/0250871 | A1 | 8/2017 | Frey et al. | |
| 2017/0277568 | A1 * | 9/2017 | Lu | G06F 9/50 |
| 2018/0048532 | A1 * | 2/2018 | Poort | H04L 67/10 |
| 2018/0091516 | A1 | 3/2018 | Nixon et al. | |
| 2019/0109877 | A1 * | 4/2019 | Samuel | G06F 21/44 |
| 2019/0280955 | A1 * | 9/2019 | Gandhi | H04L 43/045 |
| 2020/0134620 | A1 * | 4/2020 | Aiello | H04L 12/1403 |
| 2020/0151032 | A1 * | 5/2020 | Zhang | G06F 9/4881 |
| 2020/0220939 | A1 * | 7/2020 | Lawson | H04M 15/44 |
| 2020/0244472 | A1 * | 7/2020 | Dinkelaker | H04L 9/50 |
| 2022/0147400 | A1 * | 5/2022 | Cowan | G06F 11/3409 |

* cited by examiner

FIG. 3

Advanced Configuration for OpenShift

| Field | Description |
|---|---|
| Log Level | Verbosity of the collector logs |
| Use SSL? | Access Kubernetes API over SSL |
| Verify SSL? | Verify Kubernetes SSL certificate. Do not enable if using self-signed certificates. |
| Kubelet Port | Port the Kubernetes API pod is listening on |
| Docker Cgroup namespace | |
| Data Age Period | Age period of data for clean cache. Must be in minutes. |
| Default LAN I/O | A fallback value for LAN I/O speed per node, if the collector cannot determine the actual LAN speed. |
| Default WAN I/O | A fallback value for WAN I/O speed per node, if the collector cannot determine the actual WAN speed. |
| Default Disk I/O | A fallback value for disk I/O speed per node, if the collector cannot determine the actual disk speed. |

FIG. 4

Advanced Configuration for Meter API

| Field | Description |
| --- | --- |
| Organization ID | Unique ID of the 6fusion Meter Organization to submit inventory under. |
| OAuth Token | OAuth Token for accessing the 6fusion Meter. Leave blank if not enabled. |
| Host | Address of the 6fusion Meter |
| Port | Port of the 6fusion Meter API |
| Use SSL? | Access the 6fusion Meter over SSL |
| Verify SSL? | Verify Meter API SSL certificate. Do not enable if using self-signed certificates. |

FIG. 5

OpenShift Collector

Steps to install the OpenShift Collector plugin outside of the 6fusion Meter cluster.

OpenShift

1. Navigate to the downloaded OpenShift project template file.
2. Confirm the variables in the command below are correct. (You may edit the script to make changes).
3. Copy and run the following commands.

```
PROJECT_NAME=6fusion-openshift-collector
DISPLAY_NAME="6fusion OpenShift Collector"
FILENAME=openshift-collector.yaml
oc new-project $PROJECT_NAME \
    --display-name="$DISPLAY_NAME" \
    --description="Collects inventory and consumption metrics of OpenShift projects
oc create -f $FILENAME
oc create serviceaccount 6fusion-openshift-collector
oc adm policy add-cluster-role-to-user \
  system:node-reader \
  system:serviceaccount:${PROJECT_NAME}:6fusion-openshift-collector

# The following line grants access to all projects.
for project in `oc projects -q`; do \
  oc adm policy add-role-to-user view -n $project system:serviceaccount:${PROJECT_N
done

# If you prefer to limit access to specific projects, or add new projects,
#   run the following for each desired project (in place of the loop above)
# oc adm policy add-role-to-user view system:serviceaccount:{PROJECT_NAME}:6fusion-
```

*Click here to copy the commands*

The OpenShift Collector template is now ready to be deployed.

4. In your OpenShift web console, browse to the new 6fusion OpenShift Collector project.
5. Select Add to project.
6. Enter *6fusion* in the *Filter by name or description* field to list the template.
7. Click Select.
8. Confirm the field values, then click Create.
9. Your 6fusion OpenShift Collector is now deployed.

FIG. 6

SYSTEMS AND METHODS FOR CONTAINERIZED INFORMATION TECHNOLOGY RESOURCE MANAGEMENT BASED ON CUSTOMIZATION OF KUBERNETES PODS

CROSS-REFERENCES TO RELATED APPLICATIONS

The present invention is related to and claims priority from the following U.S. patent documents: this application is a continuation of U.S. application Ser. No. 16/418,480 filed May 21, 2019, which is a continuation of U.S. application Ser. No. 16/038,936 filed Jul. 18, 2018, which claims priority from U.S. Provisional Patent Application No. 62/666,910 filed May 4, 2018, each of which is incorporated herein by reference in its entirety.

BACKGROUND OF THE INVENTION

Field of the Invention

This invention relates to systems and methods for Information Technology (IT) management. More particularly, the present invention relates to systems and methods for containerized IT intelligence and management.

Description of the Prior Art

IT technology has gone through the early hardware era, the virtualization era, and the cloud era. Computing resources on premises are reduced significantly to provide flexibility for businesses. In recent years, containerization is revolutionizing IT infrastructures. Different applications consume computing resources in different patterns, and cause waste in purchasing computing resources. Metering capacity and consumption for containerized IT infrastructure has become critical for IT management and optimization.

By way of example the following are relevant prior art documents relating to computing resource management:

U.S. Publication No. 2016/0275469 for "Systems and methods for providing information technology on an as-used basis" by inventor Paul L. Gendler, filed Mar. 18, 2016 and published Sep. 22, 2016, describes systems and methods for providing use of information technology in exchange for a fee based more precisely on actual or near actual use. Information technology may include software and/or hardware, which may be grouped into a convergent infrastructure or convergent architecture. Use of the hardware and/or software may be monitored, such as with metering software, by measuring usage metrics to determine resource usage. The raw metrics data may be converted into at least one common unit of measure. The raw or converted metrics may be used to determine a fee based on resource usage. The fee may be based on a fee rate, determined or calculated with reference to various information such as the type of information technology being used. The user may be charged the fee based on actual past usage, an approximation of past usage, an estimation of future usage, or a different usage basis.

U.S. Pat. No. 9,985,827 for "Automated generation of deployment workflows for cloud platforms based on logical stacks" by inventor Li Li, filed May 24, 2016 and issued May 29, 2018, describes a method implemented in a data center management node. The method includes obtaining, from memory, a physical stack describing a configuration of platform components across multiple operating platforms on a data center infrastructure, generating, by a processor, a graph describing correlations between the operating platforms and the data center infrastructure based on a platform library, wherein the platform library describes configurations of the platform components for each of the operating platforms separately, generating, by the processor, one or more logical stacks based on the graph, wherein the one or more logical stacks indicate deployable configurations of the operating platforms without depicting the platform components, and representing the logic stack to a user.

U.S. Publication No. 2018/0091516 for "Network-accessible resource management system with distributable governance" by inventors Brian Gregory Nixon, et al., filed Dec. 18, 2015 and published Mar. 29, 2018, describes a resource management system comprising a computer-implemented platform running on at least one computing device, said platform for running a plurality of interoperable resource agents, each resource agent being a representation of at least an aspect of a resource, wherein at least one aspect of governance of each said resource agent is distributable by a first rights holder to any one or more second rights holder; and a communications interface for interfacing said platform and at least one resource-related computing device, each resource-related computing device associated via said communications interface with at least one of said resource agents in accordance with an access contract; wherein governance comprises the ability to authorize the further distribution of any one or more aspect of governance by the at least one second rights holder over at least an aspect of the resource agent over which the first user has governance.

U.S. Publication No. 2017/0250871 for "Skeletal Refresh for Management Platforms" by inventors Jason W. Frey, et al., filed Feb. 26, 2016 and published Aug. 31, 2017, describes a method of implementations including determining, by a processing device in a management platform, an occurrence of an inventory event in a computing environment managed by the management platform, wherein the computing environment comprises a plurality of managed objects, and invoking a relationship handler to obtain identifying attributes for a target managed object corresponding to the inventory event. The relationship handler is further to update the identifying attributes and relationship attributes corresponding to the target managed object in an inventory tree maintained by the management platform, the relationship attributes comprising an identification of affiliations between two or more managed objects and for each managed object affiliated to the target managed object, and schedule a job in a message queue to update each of the attributes for the managed object, the detailed attributes comprising attributes of the managed object that are not identifying attributes or relationship attributes.

SUMMARY OF THE INVENTION

The present invention provides systems and methods for containerized IT intelligence and management In one embodiment, a system for containerized IT financial management comprises at least one collector, at least one meter, at least one connector, and a reporting dashboard. The at least one collector is connected to at least one container platform via at least one Application Programming Interface (API). The at least one collector sends capacity (i.e., inventory) and consumption metrics to the at least one meter for processing and aggregation. In one embodiment, multiple collectors are deployed to the same meter. In another embodiment, the at least one collector is deployed separately from the at least one meter. In one embodiment, remote-installation options are available for the at least one collector.

One embodiment of the present invention includes a system for containerized Information Technology (IT) intelligence and management, including a meter platform and at least one analytics platform, wherein the meter platform comprises at least one collector, at least one meter application programing interface (API), and at least one connector, wherein the at least one collector comprises an infrastructure collector container, an inventory collector container, a metrics collector container, and a local database container, wherein the at least one meter API comprises a Workload Allocation Cube (WAC) calculator container, wherein the at least one collector is customized for at least one container platform and is configured to collect and transmit capacity data, consumption data, and cost data from the at least one container platform to the at least one meter, wherein the at least one meter is configured to measure, aggregate, and store the capacity data, the consumption data, and the cost data from the at least one collector, thereby creating meter data, wherein the at least one connector is configured to extract, transform, and load the meter data to the at least one analytics platform, and wherein the at least one analytics platform is configured to track computing resource usage, provide insight of the computing resource usage, and optimize the computing resource usage of the at least one container platform in real time.

Another embodiment of the present invention includes a system for containerized Information Technology (IT) intelligence and management, including at least one collector, at least one meter, and at least one connector, and at least one analytics platform, wherein the at least one collector comprises an infrastructure collector container, an inventory collector container, a metrics collector container, and a local database container, wherein the at least one meter comprises at least one meter application programing interface (API), wherein each of the at least one meter API comprises a Workload Allocation Cube (WAC) calculator container, wherein the at least one collector is customized for at least one container platform and is configured to collect and transmit sample data for processor usage, memory usage, storage usage, Disk I/O, LAN I/O, and WAN I/O from the at least one container platform to the at least one meter, wherein the at least one meter is configured to measure consumption of the at least one container platform based on the sample data from the at least one collector, thereby creating meter data, wherein the at least one connector is configured to extract, transform, and load the meter data to the at least one analytics platform, and wherein the at least one analytics platform is configured to track computing resource usage, provide insight of the computing resource usage, and optimize the computing resource usage of the at least one container platform in real time. Yet another embodiment of the present invention includes a method for containerized Information Technology (IT) intelligence and management, including providing at least one collector, at least one meter, at least one connector, and at least one analytics platform, wherein the at least one collector is customized for at least one container platform, wherein the at least one collector comprises an infrastructure collector container, an inventory collector container, a metrics collector container, and a local database container, wherein the at least one meter comprises at least one meter application programing interface (API), wherein each of the at least one meter API comprises a Workload Allocation Cube (WAC) calculator container, the at least one collector collecting and transmitting consumption data, capacity data, and cost data from the at least one container platform to the at least one meter, the at least one meter measuring, aggregating, and storing the capacity data, the consumption data, and the cost data from the at least one collector, thereby creating meter data, the at least one connector extracting, transforming, and loading the meter data to the at least one analytics platform, and the at least one analytics platform tracking computing resource usage, providing insight of the computing resource usage, and optimizing the computing resource usage of the at least one container platform based on the meter data in real time.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 3 is a user interface for configuration and installation of a collector according to one embodiment of the present invention.

FIG. 4 displays a list of fields in Advanced Configuration for a container platform environment.

FIG. 5 displays a list of fields in Advanced Configuration for a meter API.

FIG. 6 displays a dialogue with deployment instructions for an OpenShift collector.

DETAILED DESCRIPTION

Figure 1:
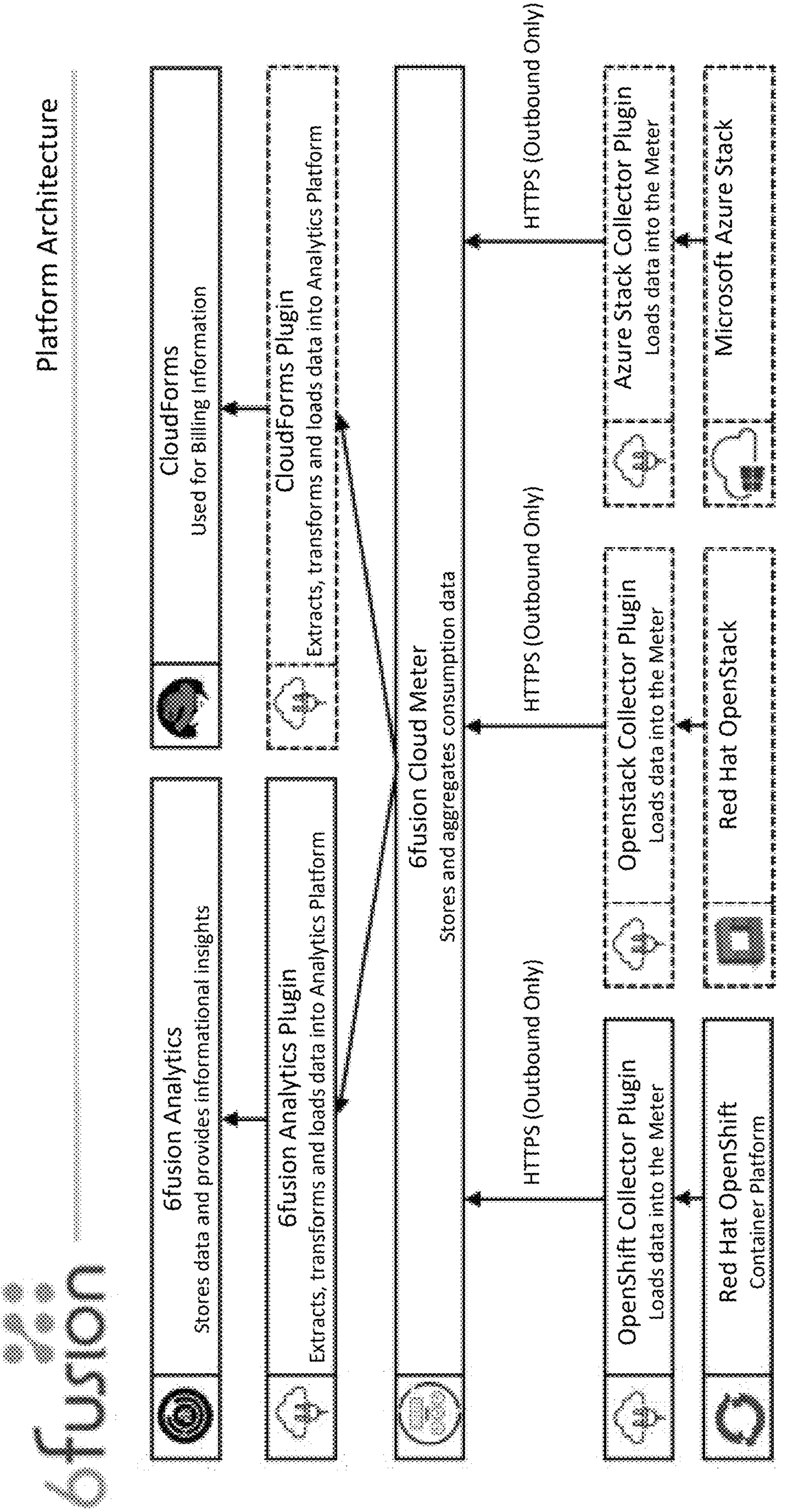
FIG. 1 illustrates a meter platform architecture for providing containerized IT intelligence and management according to one embodiment of the present invention.

Cloud computing provides the ability to deliver and consume computing resources as needed. It allows the hardware requirement on premises to be reduced significantly. Furthermore, it is flexible to increase or decrease computing capacity based on demand. Cloud computing thus creates huge opportunities for companies, big or small, to right-size spend, matching to the needs for any given hour of the day.

Containerization is operating-system-level virtualization. In operating-system-level virtualization, the core operating system allows the existence of multiple isolated user-space instances, which are called containers. Containers provide development velocity and scalability. However, containers reintroduce huge waste back into the purchasing equation for businesses. Unlike an instance, the lifespan of a container can be as little as seconds and requires a tiny amount of computing resources to complete its task. The smallest instance can accommodate many running containers and each container uses a variable amount of computing resources. Paying by the instance hour is inefficient and causes the amount of wasted spend to increase significantly. Given the highly dynamic and wildly volatile nature of container technology usage, tracking and reporting the true cost of delivering application services is nearly impossible. The true cost includes costs for a plurality of computing resource types including processors (CPUs), memory, storage, input/output (I/O), and local and wide area network resources. The root of the problem is that in the world of containers, granular visibility at the server, virtual machine or even instance level is not good enough. In other words, with the container technology, the abstraction layer from public or private infrastructure provides development velocity and scalability, but also creates financial friction.

The present invention provides systems and methods for containerized IT intelligence and management. The true cost of operating container platforms is determined at the most granular level, and the container platforms are operated and managed efficiently based on the true cost. Systems and methods of the present invention also provide utility style billing for internal business units and external customers based on the true cost, and therefore enable billing and paying for containerized application services like a utility.

The present invention relates to IT metering infrastructure disclosed in U.S. Pat. No. 8,756,302, which is incorporated herein by reference in its entirety.

In one embodiment, the present invention provides cloud native application metering for Original Equipment Manufacturers (OEMs), resellers, and partners. In one embodiment, containerized consumption of IT infrastructure is analyzed by application and/or service. Containerized consumption reports are delivered for billing, cost recovery, and software governance. In one embodiment, the present invention provides metering and managing computing resources as a service for containerized IT infrastructure.

In one embodiment, the present invention provides collectors for containerized metering. Enterprises are enabled to have the same type of access and control, get specific applications into production much faster, and provide more efficient service for customers.

As application services further separate from underlying infrastructure, it becomes harder for developers, operators, and financial officers to have meaningful insights into optimized asset utilization. The systems and methods of the present invention are operable to discover and deliver customer hosts, capacity, containers, and application services in real time to solve this problem. The systems and methods of the present invention further provide a full view of resources consumed from the infrastructure layer up through containers and projects using a single, standardized approach to measuring consumption of containerized IT infrastructure across hybrid cloud and on-premises assets. The systems and methods in the present invention further provide optimized solutions based on actual consumptions and costs in containerized IT infrastructure, thereby defining a true cost for commercial provision of infrastructure-as-a-service.

In one embodiment, a system for containerized IT management includes at least one collector, at least one meter, at least one connector, and a reporting dashboard. The at least one collector is connected to at least one container platform via at least one API. The at least one collector sends capacity (i.e., inventory) and consumption metrics to the at least one meter for processing and aggregation. In one embodiment, the system is operable to deploy multiple collectors to the same meter. In one embodiment, the at least one collector is deployed separately from the at least one meter. In one embodiment, remote-installation options are available for the at least one collector. In one embodiment, there is a first level of specific collectors collecting data from specific metered infrastructure on one end and transmitting the collected data to a second level of general collectors on the other end, which in turn loads the collected data to the at least one meter.

Preferably, the at least one collector determines and measures application consumption of IT capacity using a unit-of-measure for IT infrastructure as disclosed in U.S. Pat. No. 8,756,302, which is incorporated herein by reference in its entirety. In one embodiment, the unit-of-measure is termed as a Workload Allocation Cube (WAC) unit including six metrics commonly used in software computing (e.g. MHz for CPU or processor usage, Mbytes for memory usage, Kbytes/sec for I/O, Kbytes/sec for Local Area Network (LAN) usage, Kbits/sec for Wide Area Network (WAN) usage and Gbytes for storage usage) with appropriate weighting and conversion factors. In another embodiment, the unit-of-measure has different variations based on consumption patterns of certain IT infrastructure. For example, but not for limitation, different WACs are derived from the original WAC with different coefficients for different types of usages, such as even standard usage, heavy memory usage, and heavy storage usage.

In one embodiment, the at least one collector is operable to determine and measure the consumption of containers that power applications. Applications that power businesses are optimized based on the consumption measurement. The consumption measurement can be interpreted by service or by Docker image. For example, the highest-used service and/or the most-used software solution can be identified based on the consumption measurement.

In one embodiment, the collector pulls consumption data, capacity data, and cost data from the metered infrastructure. The collector comprises an infrastructure collector, an inventory collector, a metrics collector, and a local database. In another embodiment, the collector further comprises an on-premises connector and a cache cleaner. The inventory collector retrieves a list of containers that will be metered and associated metadata. The list of containers is updated as containers are added or removed for consumption. The list of containers and the associated metadata are stored in the local database. A flag is set to indicate the metered state of the list of containers and record in the local database. For example, but not for limitation, when the flag is set as "false" for a container, it means the container is not metered yet. The metrics collector reads the local database to find records for the list of containers that have the metered state set as "false," collects sample data for CPU usage, memory usage, storage usage, Disk I/O, LAN I/O, and WAN I/O. The metrics collector then updates the records in the local database with the collected sample data. In one embodiment, the on-premises connector reads the local database, and for each record sends the sample data to a meter via a meter API. In one embodiment, the meter API comprises an API container and a WAC calculator container. In another embodiment, the meter API further comprises a cost calculator container, a capacity calculator container, and a data retention manger container. In one embodiment, the meter calculates the consumption (preferably in kWACs) for each sample and creates readings every 5 minutes in an internal datastore. In one embodiment, the meter aggregates the 5-minute readings and creates daily and/or monthly readings for each machine, infrastructure, and organization.

In one embodiment, the present invention provides a meter platform architecture for containerized IT management and optimization. A meter platform is communicatively connected to at least one container platform via at least one collector and at least one analytics platform via at least one connector. The at least one collector collects consumption data, capacity data, and cost data from the at least one container platform and transmits this data to the meter platform. The meter platform measures, aggregates, and stores the consumption data, capacity data, and cost data from the at least one container platform. The at least one connector extracts, transforms, and loads data from the meter platform to the at least one analytics platform. The at least one analytics platform provides insights and optimized solutions for the at least one container platform based on the data obtained from the meter platform via the at least one connector.

The at least one analytics platform is operable to create and deliver consumption reports used for billing, cost recovery, or showback. The consumption reports can be further used to increase capital efficiency and govern software licensing. In one embodiment, the at least one analytics platform provides a planning tool for operators to adjust usage of certain IT infrastructure via a Graphical User Interface (GUI). In one embodiment, the at least one analytics platform provides a contract calculator for consumers to maximize savings from consumption via a GUI. In one embodiment, the at least one analytics platform provides a finance calculator for computing resource providers to track and optimize Return on Investment (ROI) via a GUI based on consumption patterns, contract rates, estimated growth cycles, etc. In one embodiment, an operator is a piece of software for creating, configuring, and managing instances of container applications on behalf of a user. In one embodiment, at least one software operator is constructed and configured for network communication with the meter platform, which connects to at least one analytics platform via at least one connector. The meter platform is operable to measure, aggregate and process data from the container-based applications managed by the at least one software operator. In a cloud environment, the meter platform enables cloud budgeting and cloud billing. Businesses are enabled to track resource usages, view service usage and metrics, and gain insight into how cloud resources are being used.

Referring now to the drawings in general, the illustrations are for the purpose of describing a preferred embodiment of the invention and are not intended to limit the invention thereto.

FIG. 1 illustrates a meter platform architecture for containerized IT intelligence and management according to one embodiment of the present invention. At least one collector is provided and plugged into corresponding IT infrastructure. The at least one collector pulls consumption data, capacity data, and cost data from the corresponding IT infrastructure and transmits this data to a cloud meter platform. In one embodiment, communications from the at least one collector to the cloud meter platform is one-way only via Hypertext Transfer Protocol Secure (HTTPS). FIG. 1 illustrates three collectors for three different container platforms (i.e., Red Hat OpenShift, Red Hat OpenStack, and Microsoft Azure Stack) as an example but not limitation for the containerized IT infrastructure. The cloud meter platform stores and aggregates data received from the corresponding IT infrastructure via the at least one collector. The cloud meter platform then transmits data to at least one analytics platform via at least one respective connector. In one embodiment, the meter platform architecture comprises at least one analytics platform. The at least one analytics platform is communicatively connected to the cloud meter platform via at least one connector. The at least one connector is operable to extract, transform and load data from the cloud meter platform to the at least one analytics platform. The at least one analytics platform is operable to store data and provide informational insights. In another embodiment, at least one third-party analytics platform is operable to communicatively connect to the meter platform architecture of the present invention via at least one connector customized for the at least one third-party analytics platform. For example, a CloudForms analytics platform is connected to the cloud meter platform of the present invention via a CloudForms connector. In FIG. 1, the CloudForms connector is shown as a CloudForms plugin. CloudForms is an enterprise grade multi-cloud management platform that helps operations set up policy controlled, self-service environments for cloud users, detect and respond to environment changes by tracking activities, capturing events, and sensing configuration changes. The CloudForms analytics platform is operable to create billing information based on data aggregated from the cloud meter platform.

Figure 2:
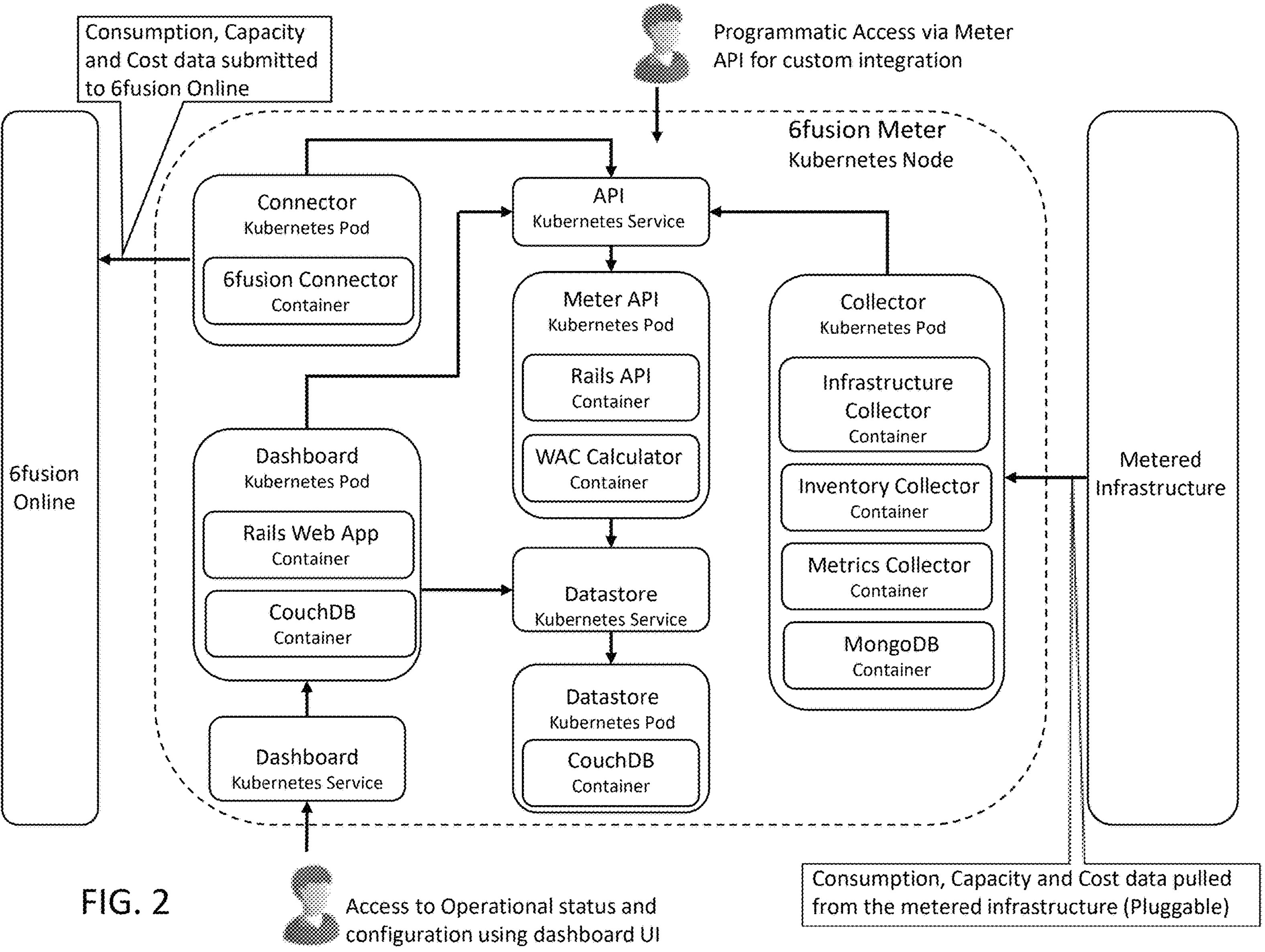
FIG. 2 illustrates components of a meter platform for providing containerized IT intelligence and management according to another embodiment of the present invention.

FIG. 2 illustrates components of a meter platform for containerized IT intelligence and management according to another embodiment of the present invention. In one exemplary embodiment, provided for illustration purposes, the platform architecture is a Kubernetes node. Kubernetes is a portable, extensible open-source platform for managing containerized workloads and services, that facilitates both declarative configuration and automation. A Kubernetes node is a virtual machine or a physical machine. A Kubernetes pod is a Kubernetes abstraction that represents a group of one or more application containers and some shared resources for those containers. A Kubernetes service is a Kubernetes abstraction which defines a logical set of Kubernetes pods and a policy by which to access them.

The meter platform includes at least one collector. By way of illustration but not limitation, the meter platform includes one collector. In one embodiment, the collector is a set of Kubernetes pods comprising an infrastructure collector, an inventory collector, a metrics collector, and a local MongoDB database. MongoDB is a free and open-source cross-platform document-oriented database program. The collector pulls consumption data, capacity data and cost data from the metered infrastructure.

The meter platform also includes a meter API providing programmatic access for custom integration. In one embodiment, the meter API comprises a Kubernetes service meter API and a Kubernetes pod meter API. The Kubernetes service meter API defines and connects to the Kubernetes pod meter API, which comprises a Rails API container and a WAC calculator container. Rails is a server-side web application framework written in Ruby under the MIT License.

The meter platform also includes a datastore. The datastore comprises a Kubernetes service datastore and a Kubernetes pod datastore. The Kubernetes service datastore defines and connects to the Kubernetes pod datastore. In one embodiment, the Kubernetes pod datastore comprises a CouchDB container. CouchDB is open source database software that focuses on ease of use and having a scalable architecture.

The meter platform further includes a dashboard providing access to operational status and configuration of the metered infrastructure via a dashboard user interface. The dashboard comprises a Kubernetes service dashboard and a Kubernetes pod dashboard. The Kubernetes service dashboard defines and connects to the Kubernetes pod dashboard. The Kubernetes pod dashboard comprises a Rails Web App container and a CouchDB container. The Kubernetes pod dashboard is operable to access the Kubernetes service datastore and the Kubernetes service meter API.

The meter platform further includes a connector for submitting consumption data, capacity data, and cost data to an analytics platform online. In one embodiment, the connector is a Kubernetes pod comprising a connector container.

In one embodiment, a collector is customized and configured for a specific container platform environment and a meter platform. The collector communicates with an API of the specific container platform environment for aggregating capacity and consumption metrics and transmits to the meter platform for processing and aggregating via an API of the meter platform. In one embodiment, multiple collectors of multiple different container platform environments are deployed to the same meter platform. In one embodiment, collectors are configured and installed remotely. As an example, but not for limitation, FIGS. 3-6 illustrates configuration and installation of a collector according to one embodiment of the present invention.

Figure 3:
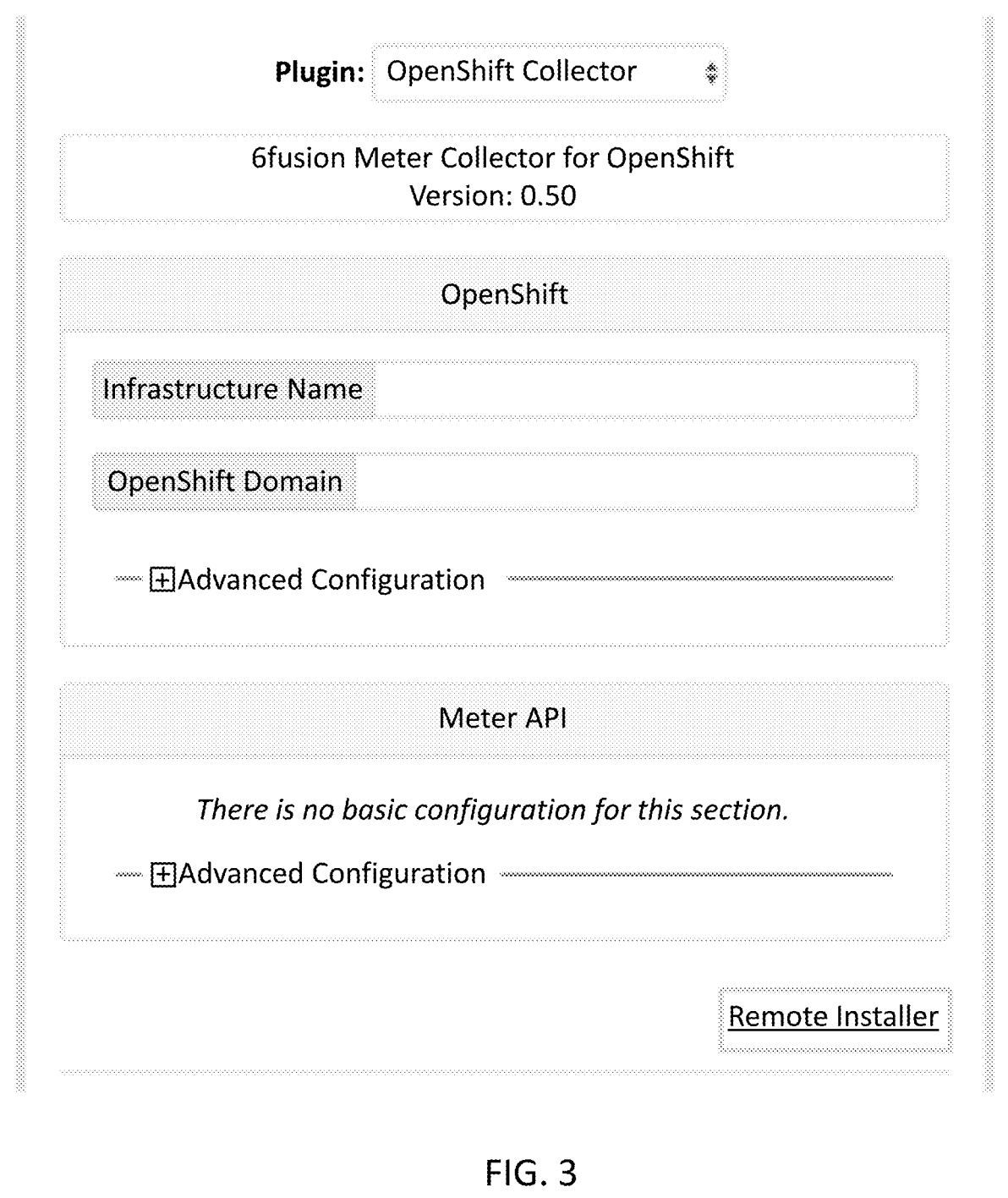

FIG. 3 displays a user interface for configuration and installation of a collector according to one embodiment of the present invention. In one embodiment, an OpenShift collector is selected to install in an OpenShift container platform environment. The OpenShift collector communicates with the OpenShift API to collect inventory and consumption metrics from the OpenShift container platform environment. The metrics are then sent to a meter platform for processing and aggregation via a meter API.

Information for Infrastructure Name and OpenShift Domain is required for collector configuration. The Infrastructure Name is a unique name to be applied to the OpenShift cluster, which provides for distinguishing between applications deployed to different OpenShift environments. The OpenShift Domain is the domain of an OpenShift Dedicated Cluster. For example, if an OpenShift console is accessible at console.6fusion.openshift.com, the 6fusion.openshift.com is entered as the OpenShift Domain. FIG. 4 displays a list of fields in Advanced Configuration for an OpenShift environment. FIG. 5 displays a list of fields in Advanced Configuration for the meter API.

By click-selecting "Remote Installer," an OpenShift-compatible YAML file is downloaded by a browser to a local file system. A dialogue with deployment instructions then appears as shown in FIG. 6. A link is provided near the bottom-left of the dialogue to simplify copying the script content.

In one embodiment, if the meter is not deployed within an OpenShift environment, the meter API should access to the OpenShift environment network on port 443 so that the OpenShift collector communicates with the meter.

The present invention solves a technical problem of wasting computing resources in containerized IT infrastructure by measuring and optimizing capacity and consumption of container platforms with an advanced measurement unit. Container platforms are in network communication via customized collectors. The solutions are not well-understood, routine, or conventional. The present invention provides improvements to containerized IT intelligence and management, which is inextricably tied to computer technology. The solutions provided by the present invention are necessarily rooted in computer technology in order to overcome problems specifically arising in the realm of computer networks.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for containerized Information Technology (IT) resource management, comprising:

a Kubernetes node;

wherein the Kubernetes node is a physical machine;

wherein the Kubernetes node comprises at least one collector, at least one meter application programing interface (API), and at least one connector;

wherein the at least one collector is a first Kubernetes pod;

wherein the at least one collector comprises an inventory collector container;

wherein the at least one collector is customized for at least one container application platform with information comprising a unique name to be applied to a container cluster in a container environment, a domain name for a dedicated cluster in the container environment, a log level indicating a verbosity of a collector log, whether to use an Secure Sockets Layer (SSL), whether to verify the SSL, an age period of data for clean cache, a fallback value for Local Area Network (LAN) Input/Output (I/O) speed per node if the at least one collector cannot determine an actual LAN speed, a fallback value for Wide Area Network (WAN) I/O speed per node if the at least one collector cannot determine an actual WAN speed, and a fallback value for disk I/O speed per node if the at least one collector cannot determine an actual disk speed;

wherein the at least one meter API is configured with information comprising an organization ID, a host address, and a port;

wherein the inventory collector container is operable to retrieve a list of application containers for metering from each of the at least one container application platform;

wherein the inventory collector container is operable to store a metered state of each application container in the list of application containers;

wherein the at least one meter API is further configured to measure consumption of the at least one container application platform, thereby creating meter data;

wherein the list of application containers is operable to be updated based on the consumption;

wherein the at least one connector is configured to extract, transform, and load the meter data;

wherein computer resource usage of the at least one container application platform is tracked and optimized in real time; and wherein the at least one connector is a second Kubernetes pod of the Kubernetes node.

2. The system of claim 1, wherein the at least one collector further comprises a local database container operable for storing the list of application containers and associated metadata.

3. The system of claim 1, wherein the at least one meter API comprises a Workload Allocation Cube (WAC) calculator container operable for calculating processor usage, memory usage, storage usage, Disk I/O, LAN I/O, and WAN I/O with weighting factors based on computing resource types for the at least one container application platform.

4. The system of claim 1, wherein the organization ID is a unique ID of the Kubernetes node to submit inventory under, wherein the host address is an address of the Kubernetes node, and wherein the port is a port of the at least one meter API.

5. The system of claim 1, wherein the at least one collector further comprises a metrics collector container operable to collect sample data of computing resource usage by application containers not metered yet, and wherein the sample data comprises processor usage data, memory usage data, storage usage data, Disk I/O data, LAN I/O data, and WAN I/O data.

6. The system of claim 1, wherein the information further includes an Open Authorization token, wherein the Open Authorization token is for accessing the Kubernetes node.

7. The system of claim 1, wherein the information further includes whether to use a Secure Sockets Layer (SSL) for the at least one meter API and whether to verify the SSL for the at least one meter API.

8. The system of claim 1, wherein the Kubernetes node further comprises a reporting dashboard user interface providing access to operational status and configuration of the at least one container application platform.

9. The system of claim 1, wherein the Kubernetes node includes a processor and a memory.

10. A system for containerized Information Technology (IT) resource management, comprising:

a Kubernetes node, including at least one collector, at least one meter, at least one meter application programming interface (API), and at least one connector;

wherein the Kubernetes node is a physical machine;

wherein the at least one collector is a first Kubernetes pod;

wherein the at least one collector comprises an inventory collector container;

wherein the at least one collector is customized for at least one container application platform with information comprising a unique name to be applied to a container cluster in a container environment, a domain name for a dedicated cluster in the container environment, a log level indicating a verbosity of a collector log, whether to use an Secure Sockets Layer (SSL), whether to verify the SSL, an age period of data for clean cache, a fallback value for Local Area Network (LAN) Input/Output (I/O) speed per node if the at least one collector cannot determine an actual LAN speed, a fallback value for Wide Area Network (WAN) I/O speed per node if the at least one collector cannot determine an actual WAN speed, and a fallback value for disk I/O speed per node if the at least one collector cannot determine an actual disk speed;

wherein the at least one meter API is configured with information comprising an organization ID, a host address, and a port;

wherein the inventory collector container is operable to retrieve a list of application containers for metering from each of the at least one container application platform;

wherein the inventory collector container is operable to store a metered state of each application container in the list of application containers;

wherein the at least one meter is configured to measure consumption of the at least one container application platform, thereby creating meter data;

wherein the list of application containers is operable to be updated based on the consumption;

wherein the at least one connector is configured to extract, transform, and load the meter data;

wherein computer resource usage of the at least one container application platform is tracked and optimized in real time; and wherein the at least one connector is a second Kubernetes pod of the Kubernetes node.

11. The system of claim 10, wherein the information further includes an Open Authorization token, whether to use a Secure Sockets Layer (SSL) for the at least one meter API, and whether to verify the SSL for the at least one meter API.

12. A method for containerized Information Technology (IT) resource management, comprising:

providing a Kubernetes node, including at least one collector, at least one meter, at least one meter application programming interface (API), at least one connector, and at least one analytics platform for at least one container application platform, wherein the Kubernetes node is a physical machine, wherein the at least one collector is a first Kubernetes pod, wherein the at least one collector comprises an inventory collector container and a metrics collector container, and wherein the at least one collector is customized for at least one container application platform with information comprising a unique name to be applied to a container cluster in a container environment, a domain name for a dedicated cluster in the container environment, a log level indicating a verbosity of a collector log, whether to use an Secure Sockets Layer (SSL), whether to verify the SSL, an age period of data for clean cache, a fallback value for Local Area Network (LAN) Input/Output (I/O) speed per node if the at least one collector cannot determine an actual LAN speed, a fallback value for Wide Area Network (WAN) I/O speed per node if the at least one collector cannot determine an actual WAN speed, and a fallback value for disk I/O speed per node if the at least one collector cannot determine an actual disk speed;

configuring the at least one meter API with information comprising an organization ID, a host address, and a port;

the inventory collector container retrieving a list of application containers for metering from the at least one container application platform;

storing a metered state of each application in the list of application containers, and updating the metered state of each application container in the list of application containers;

the metrics collector container collecting sample data of computing resource usage by application containers not metered yet;

the at least one meter measuring consumption of the at least one container application platform based on the sample data, thereby creating meter data;

the list of application containers updating based on the consumption;

the at least one connector extracting, transforming, and loading the meter data;

wherein computer resource usage of the at least one container application platform is tracked and optimized in real time; and wherein the at least one connector is a second Kubernetes pod of the Kubernetes node.

13. The method of claim 12, wherein the information further includes an Open Authorization token, whether to use a Secure Sockets Layer (SSL) for the at least one meter API, and whether to verify the SSL for the at least one meter API.

14. The method of claim 12, further comprising measuring consumption of the at least one container application platform, creating readings in an internal datastore, and aggregating the readings.

* * * * *